US011233810B2

(12) United States Patent
Luo et al.

(10) Patent No.: US 11,233,810 B2
(45) Date of Patent: *Jan. 25, 2022

(54) MULTI-SIGNAL ANALYSIS FOR COMPROMISED SCOPE IDENTIFICATION

(71) Applicant: Microsoft Technology Licensing, LLC, Redmond, WA (US)

(72) Inventors: Pengcheng Luo, Cambridge, MA (US); Reeves Hoppe Briggs, Boxborough, MA (US); Art Sadovsky, Kirkland, WA (US); Naveed Ahmad, Medford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,982

(22) Filed: Nov. 21, 2019

(65) Prior Publication Data

US 2020/0092318 A1  Mar. 19, 2020

Related U.S. Application Data

(63) Continuation of application No. 15/431,391, filed on Feb. 13, 2017, now Pat. No. 10,491,616.

(51) Int. Cl.
*H04L 29/06* (2006.01)
*G06F 21/55* (2013.01)
(Continued)

(52) U.S. Cl.
CPC .......... *H04L 63/1425* (2013.01); *G06F 21/55* (2013.01); *G06N 7/005* (2013.01);
(Continued)

(58) Field of Classification Search
CPC ................. H04L 63/1425; H04L 63/14; H04L 2463/121; G06F 21/55; G06N 20/00; G06N 7/005
See application file for complete search history.

(56) References Cited

U.S. PATENT DOCUMENTS

| 9,516,053 | B1 | 12/2016 | Muddu et al. | |
| 2007/0294187 | A1* | 12/2007 | Scherrer | G06Q 20/401 |
| | | | | 705/75 |

(Continued)

FOREIGN PATENT DOCUMENTS

| RU | 2550531 C2 | 5/2015 |
| RU | 2560784 C2 | 8/2015 |
| WO | 2017142407 A1 | 8/2017 |

OTHER PUBLICATIONS

"Office Action and Search Report Issued in Chile Patent Application No. 201902189", dated Nov. 12, 2020, 12 Pages.
(Continued)

*Primary Examiner* — Nelson S. Giddins
(74) *Attorney, Agent, or Firm* — Shook, Hardy & Bacon L.L.P.

(57) ABSTRACT

Detecting compromised devices and user accounts within an online service via multi-signal analysis allows for fewer false positives and thus a more accurate allocation of computing resources and human analyst resources. Individual scopes of analysis, related to devices, accounts, or processes are specified and multiple behaviors over a period of time are analyzed to detect persistent (and slow acting) threats as well as brute force (and fast acting) threats. Analysts are alerted to individually affected scopes suspected of being compromised and may address them accordingly.

20 Claims, 10 Drawing Sheets

(51) Int. Cl.
    *G06N 7/00* (2006.01)
    *G06N 20/00* (2019.01)
(52) U.S. Cl.
    CPC ............. *G06N 20/00* (2019.01); *H04L 63/14* (2013.01); *H04L 2463/121* (2013.01)

(56) References Cited

U.S. PATENT DOCUMENTS

2010/0202299 A1   8/2010   Strayer et al.
2016/0308725 A1   10/2016  Tang et al.
2018/0004948 A1*  1/2018   Martin .................. G06F 21/566

OTHER PUBLICATIONS

"Office Action and Search Report Issued in Colombia Patent Application No. NC2019/0008341", dated Jul. 23, 2021, 23 Pages.
"Office Action Issued in Russian Patent Application No. 2019127797", dated Jul. 5, 2021, 13 Pages.
"Office Action Issued in Israel Patent Application No. 268231", dated Jun. 27, 2021, 8 Pages.
"Office Action Issued in Indonesian Patent Application No. P00201906998", dated Jul. 1, 2021, 3 Pages.
"Office Action Issued in European Patent Application No. 18707813.4", dated May 27, 2021, 5 Pages.
"Office Action Issued in Chile Patent Application No. 201902189", dated May 17, 2021, 11 Pages.
"Office Action Issued In Thailand Patent Application No. 1901004914", dated Apr. 28, 2021, 3 Pages.

* cited by examiner

MULTI-SIGNAL ANALYSIS FOR COMPROMISED SCOPE IDENTIFICATION

CROSS REFERENCE TO RELATED APPLICATION

This application is a continuation of U.S. application Ser. No. 15/431,391, filed Feb. 13, 2017, now U.S. Pat. No. 10,491,616, which is hereby incorporated by reference in its entirety herein.

BACKGROUND

Online services are under near constant risk from malicious parties who seek to compromise devices within those online services to subvert their functionality or compromise sensitive data stored in those services. Compromised devices may have data exfiltrated to an outside device, or may be commanded to perform various actions by the malicious party, such as, for example, as part of a botnet. Identifying individual hosts that have been compromised within the online service can be a resource and time intensive operation, which can leave the malicious party in control of one or more devices for a long period of time despite countermeasures deployed in the online service. Current Security Information and Event Management (SIEM) systems may miss some compromised devices or miss-identify secure devices as compromised, which lengthens the amount of time the malicious party remains in control and increases the processing resources needed to re-secure the online service.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices embodying processor executable instructions for detecting compromised host machines are provided herein. Security signals are received by a signal abnormality analyzer to determine a level of abnormality for a given action in the online service being secured. In a large online service, groups of devices are expected to behave the same when operating properly, and therefore behaviors that are not widespread are treated with greater suspicion. The scored detection results are aggregated according to various populations of devices or sub-behaviors, and the abnormality scores are passed to a multi-signal analyzer, which collects detection results over rolling windows of time and divides them into various scopes based on device for analysis to determine whether an alert should be generated that a given device is compromised.

By using a windowed analysis of scopes, the present disclosure addresses the computer-centric problem of detecting slow-moving, advanced persistent threats as well as concentrated, fast-moving attacks on an online service with enhanced reliability. The security of computer-hosted data is thereby improved, the processing resources of the online service are more efficiently allocated to legitimate processes, as opposed to processes executed on behalf of malicious parties, in addition to a more effective allocation of the attention of analyst users to suspected breaches.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
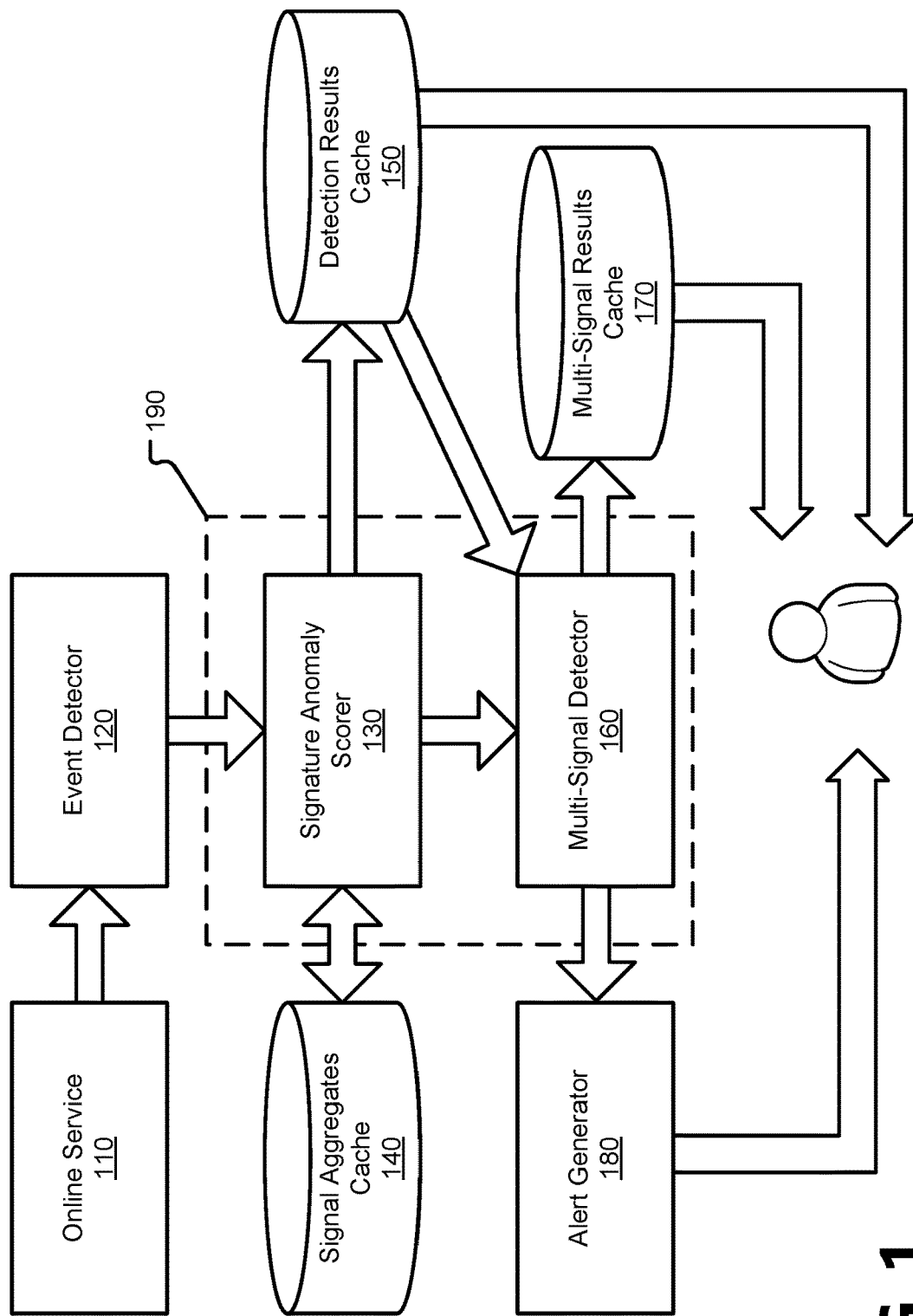
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 illustrates an example environment 100 in which the present disclosure may be practiced. As illustrated, an online service 110 communicates event signatures to an event detector 120, which uses various detection logic sets to provide detection results indicating behaviors occurring in the online service 110 to a signature anomaly scorer 130. The signature anomaly scorer 130 determines how common or uncommon a given behavior is for the online service 110 and stores counts and the detection result in a signal aggregates cache 140 and a detection results cache 150, respectively.

A multi-signal detector 160 accepts anomaly scores and detection results from the signature anomaly scorer 130 and the detection results cache 150 (new and previously observed, respectively) to predictively determine whether the observed behavior is indicative of malicious or benign activity in the online service 110. The predictive determinations are stored in a multi-signal results cache 170, and may be transmitted to an alert generator 180 when they indicate malicious behavior. An analyst or administrative user is transmitted alerts from the alert generator 180, and may access the results cached in the detection results cache 150 and the multi-signal results cache 170 for additional review.

In various aspects, the signature anomaly scorer 130 and the multi-signal detector 160 are referred to collectively as anomaly detector 190. The anomaly detector 190 may be hosted within the online service 110 as a dedicated device or distributed set of devices therein, or may be an external device or set of devices. Additionally, the event detector 120 may be part of the online service 110, of the anomaly detector 190, a third-party service, and combinations thereof. Similarly, the caches used by the anomaly detector may be part of the anomaly detector 190, the online service 110, or external storage devices.

The online service 110, event detector 120, caches, alert generator 180, and anomaly detector 190 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 8, 9A, and 9B.

While the online service 110, event detector 120, caches, alert generator 180, and anomaly detector 190 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

The online service 110 represents a networked set of computing devices, such as a cloud data center, that provides "cloud" services to various users, including, but not limited to: Infrastructure as a Service (IaaS), where the user provides the operating system and software running on the devices of the online service 110; Platform as a Service (PaaS), where the user provides the software and the online service 110 provides the operation system and devices; or Software as a Service (SaaS), where the online service 110 provides both the operating system and software to run on the devices for the users.

Various audit events are generated on devices within the online service 110, and are handled by various event detectors 120 running detection logic within a Security Information and Event Management (SIEM) as well as external detection systems providing external audit results from other systems and services. The various audit events include, but are not limited to: network communication traces, error logs, event logs, system commands, and the like.

In regard to the online service 110, behaviors associated unauthorized users or programs (e.g., viruses) are categorized as malicious, whereas behaviors associated with authorized users or programs are categorized as benign. To categorize these behaviors, detection results are passed from the event detector to the anomaly detector 190, which stores its results in the signal aggregates cache 140, detection results cache 150, and multi-signal results cache 170.

The anomaly detector 190 uses various machine learning approaches to develop models by which to evaluate multiple signals over a period of time to determine whether a given behavior is malicious or benign. The operation of the signature anomaly scorer 130 and the multi-signal detector 160 of the anomaly detector are discussed in greater detail in regard to FIGS. 2 and 4.

In response to determining that a given behavior is malicious, the anomaly detector 190 passes its determination to an alert generator 180. The alert generator 180 may transmit and present alerts to the analyst user in variety of formats including, but not limited to: an application message (e.g., within a SIEM application), email (to an email account), a text or multi-media message (to a cell or Voice over Internet Protocol (VOIP) account), a page (to a pager number), etc. Alerts are provided in near real-time (e.g., accounting for processing and transmission time) to the event that resulted in classifying the behavior as malicious, but may also be stored for later lookup and review.

Figure 2:
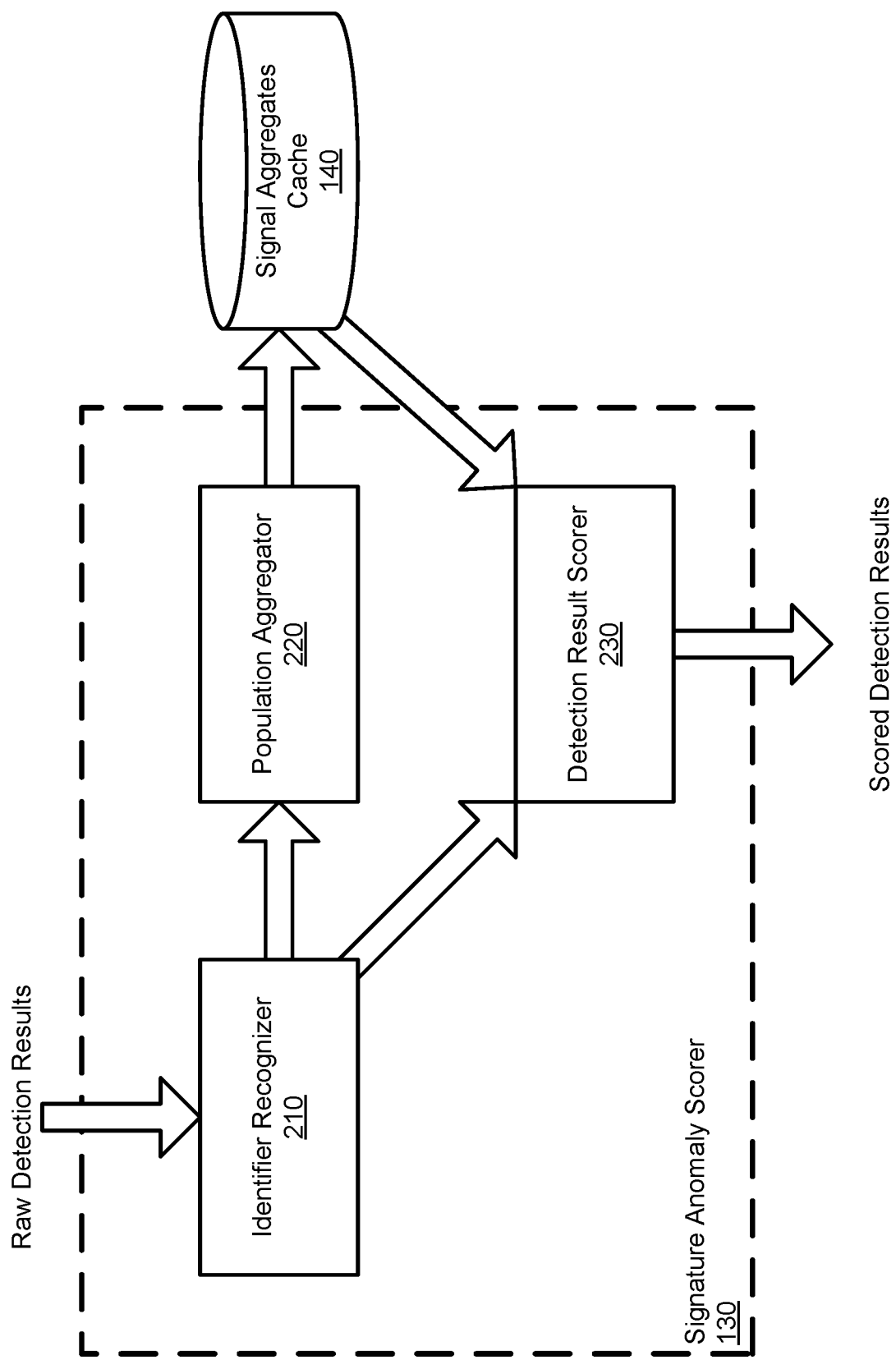
FIG. 2 illustrates details of the signature anomaly scorer.

FIG. 2 illustrates details of the signature anomaly scorer 130. The signature anomaly scorer 130 accepts raw detection results from various event detectors 120 and outputs aggregated anomaly counts to the signal aggregates cache 140, which are used to update how the signature anomaly scorer 130 outputs scored detection results to the multi-signal detector 160. The signature anomaly scorer 130 distinguishes whether a given behavior is new or has been seen before, and to what extent it has been seen before.

Raw detection results are received by an identifier recognizer 210, which determines an identifier to use in conjunction with the detection results. Various field values from the raw detection result are combined to form the identifier, which may include one or more of: a role for the device from which the behavior was observed, a user of the device from which the behavior was observed, a behavior class, a behavior requestor (user or process), a behavior object (user or process), a timestamp, or other fields present in the event signal. For example, a behavior of user A granting user B administrative permission to a device of type C at time D may result in an identifier of ABCD. In various aspects, the identifiers are produced based on the field values, but do not include the plaintext values of those fields. For example, a hashing or encrypting algorithm/function is applied to the field values when forming the identifier.

The population aggregator 220 looks up the historical counts for the particular identifier from the signal aggregates cache 140, and updates the counts accordingly. The historical counts are aggregated according to a population count for the total number of previously observed detections of the given behavior type and according to a subpopulation count of the total number of previously observed detections sharing a given identifier.

The detection result scorer 230 adds at least one anomaly score to the detection results based on the historical counts for the observed behavior. The anomaly score is based on the ratio between the subpopulation count and the population count for the given behavior, such that as the subpopulation becomes a greater portion of the population, the anomalousness of the behavior is lowered. For example, the anomaly score may use the format shown in FORMULA 1, where x, y, and z are varied in different aspects to affect the values provided for the anomaly score. As will be appreciated, FORMULA 1 is given as a non-limiting example of how to assign a score for anomalousness.

$$\text{Score}=x-((y \cdot \text{subpopulation}) \div (z \cdot \text{population})) \quad \text{FORMULA 1:}$$

The scores may be calculated according to different counts of population scopes that use raw counts for all of the events matching a given behavior, or scoped counts for the individual devices (hosts) in the online service 110 exhibiting the given behavior or the user requesting the observed behavior. To illustrate, consider events $E_1$ and $E_2$ occurring on devices $D_1$ and $D_2$ of the online service 110 in which $E_1$ has been observed three times (twice on $D_1$ and once on $D_2$) and $E_2$ has been observed once on $D_2$. The raw population count in the illustrated example is four, as $E_1$ occurred in the online service 110 three times and $E_2$ once, and the subpopulation counts are three and one for $E_1$ and $E_2$ respectively. Using FORMULA 1 with a value of one for each of x, y, and z yields an anomaly score for $E_1$ of 0.25 $[1-(1\cdot3)\div(1\cdot4)]$ and an anomaly score for $E_2$ of 0.75 $[1-(1\cdot1)\div(1\cdot4)]$.

An example scoped anomaly score, however, may yield different results from raw counts depending on the scopes selected for the population. Using a scope of device count, the scoped device population count would be two in the current illustration, as there are two distinct devices ($D_1$ and $D_2$) in the online service 110 in the illustrated example. As $E_1$ has been seen on both devices, its subpopulation count is two, whereas $E_2$ has only been seen on $D_2$, so its subpopulation count is one. Using a scope of distinct devices and FORMULA 1 with a value of one for each of x, y, and z yields an anomaly score for $E_1$ of zero $[1-(1\cdot2)\div(1\cdot2)]$ and an anomaly score for $E_2$ of 0.5 $[1-(1\cdot1)\div(1\cdot2)]$.

To prevent new events or low-population events from providing spurious anomaly scores, a threshold filter is used in some aspects to exclude very low frequency events from examination (at least temporarily). In one example, recent events are "debounced" so that the first observation of a behavior is not scored until other instances of that behavior are given time to be observed. In a second example, a population threshold is set so that a probability of zero is assigned if the population of events is too small to provide reliable results (e.g., during startup of the anomaly detector 190). In a third example, a subpopulation threshold is set so that (depending on system options) a maximum or minimum anomaly score is assigned if a subpopulation of behaviors is too small to provide reliable results in estimating a probability for that behavior being seen (e.g., for a newly assigned subpopulation to observe).

In various aspects, the observed behaviors are set according to a rolling time window, so that the events considered part of a population or subpopulation (and the associated counts thereof) are based on when they occurred. For example, only behaviors that have been observed in the past d days may be part of the rolling time window, and thus the population and subpopulation counts for determining an anomaly score may be based on recent behaviors rather than all of the observed behaviors for the online service 110. A rolling window for signal anomaly scores provides a baseline for what "normal" operations in the online service 110 look like (e.g., what the last month's use patterns are).

Additionally, by observing behaviors over a period of time, slow moving attack on the online service 110 may be observed that might otherwise be missed. A rolling multi-signal window ensures that low population or slow moving behaviors, such as Advanced Persistent Threats (APT), are observed by collecting all of the events that occur on a given device in the online service 110 to determine whether a malicious pattern for behaviors exists.

Figure 3:
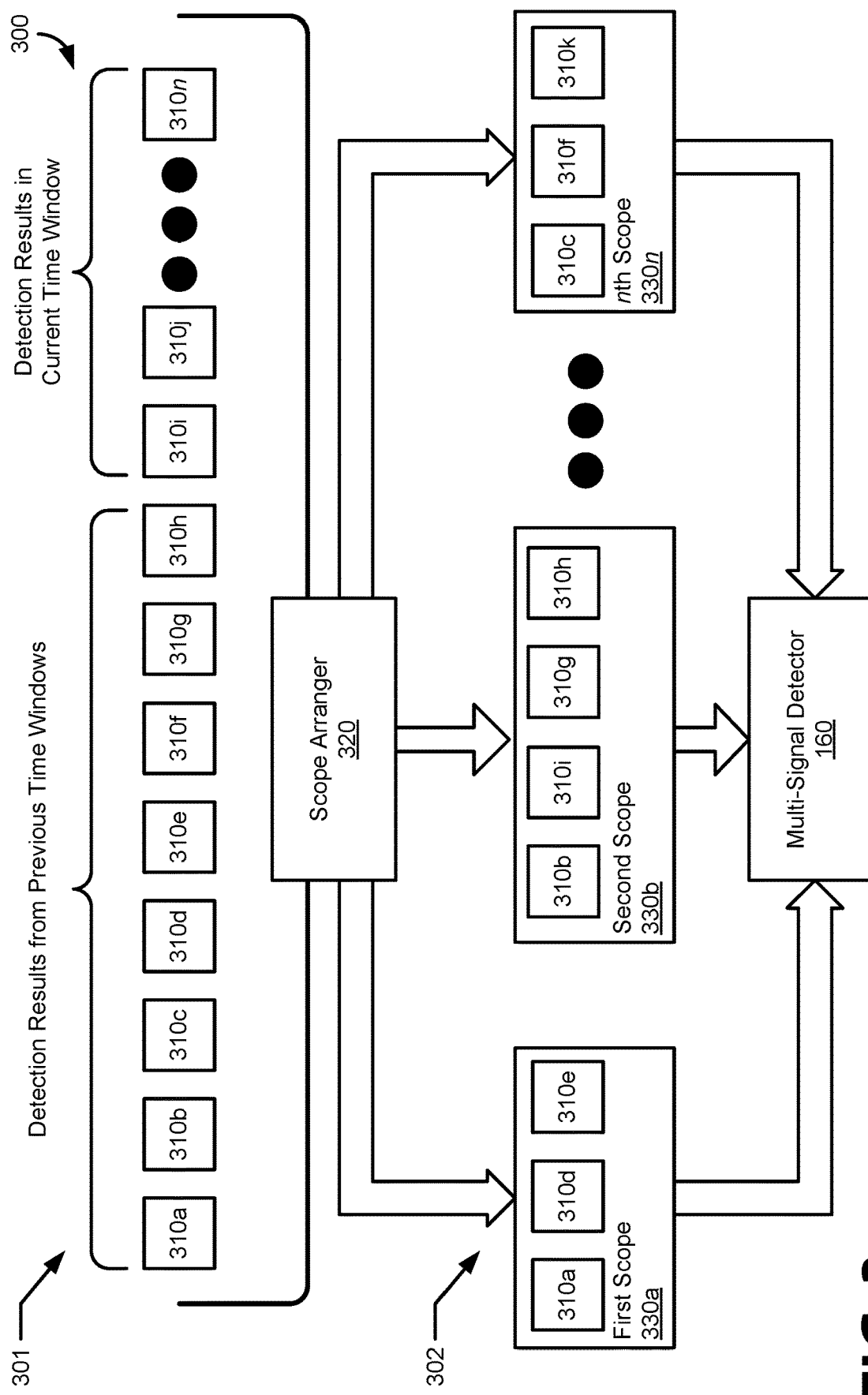
FIG. 3 is a block diagram of windowing and scoping events for multi-signal analysis.

FIG. 3 is a block diagram 300 of windowing and scoping events for multi-signal analysis. As illustrated, several event blocks 310 (individually, 310a-n) representing the observed behaviors and their associated identifiers, scores, feature vectors, timestamps, etc. are shown in a first state of organization 301 and a second state of organization 302. A scope arranger 320 is configured to window and scope the event blocks 310 from the first state of organization 301 to the second state of organization 302, which includes several scope blocks 330 (individually, 330a-n) that are fed to the multi-signal detector 160 for analysis. The multi-signal detector 160 is fed the events associated in each scope to determine whether the scope is associated with malicious activities (e.g., a compromised device, a user account accessing restricted files, a user account sending large amounts of data to a suspicious destination, a process acting erratically, etc.).

The first state of organization 301 may be that used by a detection results cache 150 or other storage device, or a stream of events from the signature anomaly scorer 130. The individual events may include those that fall within previous windows of time (e.g., those with timestamps within the last d days), such as event blocks 310a-h in the illustrated example, and those that within a current window of time (e.g., the last m minutes), such as event blocks 310g-n in the illustrated example. Events that are outside of the current window of time include those events that have been stored for longer than the analysis windows that are not included in the second state of organization 302 for further analysis.

An analyst or other administrative user sets how long the analysis window is and what properties are to be used as scopes for the second state of organization 302. For example, a device identifier, device type, or requesting user may be used to separate the various event blocks 310 into different scope blocks 330 for analysis. The various individual event blocks 310 that are designated for further analysis (those within the rolling analysis window) are arranged into scope blocks 330 based on the designated scope feature by the scope arranger 320.

For example, when a scope is defined for different devices, a first scope block 330a may correspond to a first device in the online service 110, and include event blocks 310 that are associated with the first device and have been designated for further analysis (event blocks 310a, 310d, and 310e). Similarly, second scope block 330b and nth scope block 330n would correspond to a second and nth device, respectively, from the online service 110 and include event blocks 310 that are associated with the second or nth device and have been designated for further analysis (event blocks 310b, 310i, 310g, and 310h; and event blocks 310c, 310f, and 310n).

Of the illustrated event blocks 310, event block 310j is not assigned to any of the illustrated scope blocks 330. In various aspects, an event block 310 may remain unassigned to a scope block 330 when it falls outside of the rolling analysis window, when the event block 310 is missing data by which events are assigned to different scopes (e.g., no device identifier is included in event block 310j), or the scope is configured to exclude the detection result type of the given event block 310 (e.g., the scope is defined to include only some potential behaviors).

Figure 4:
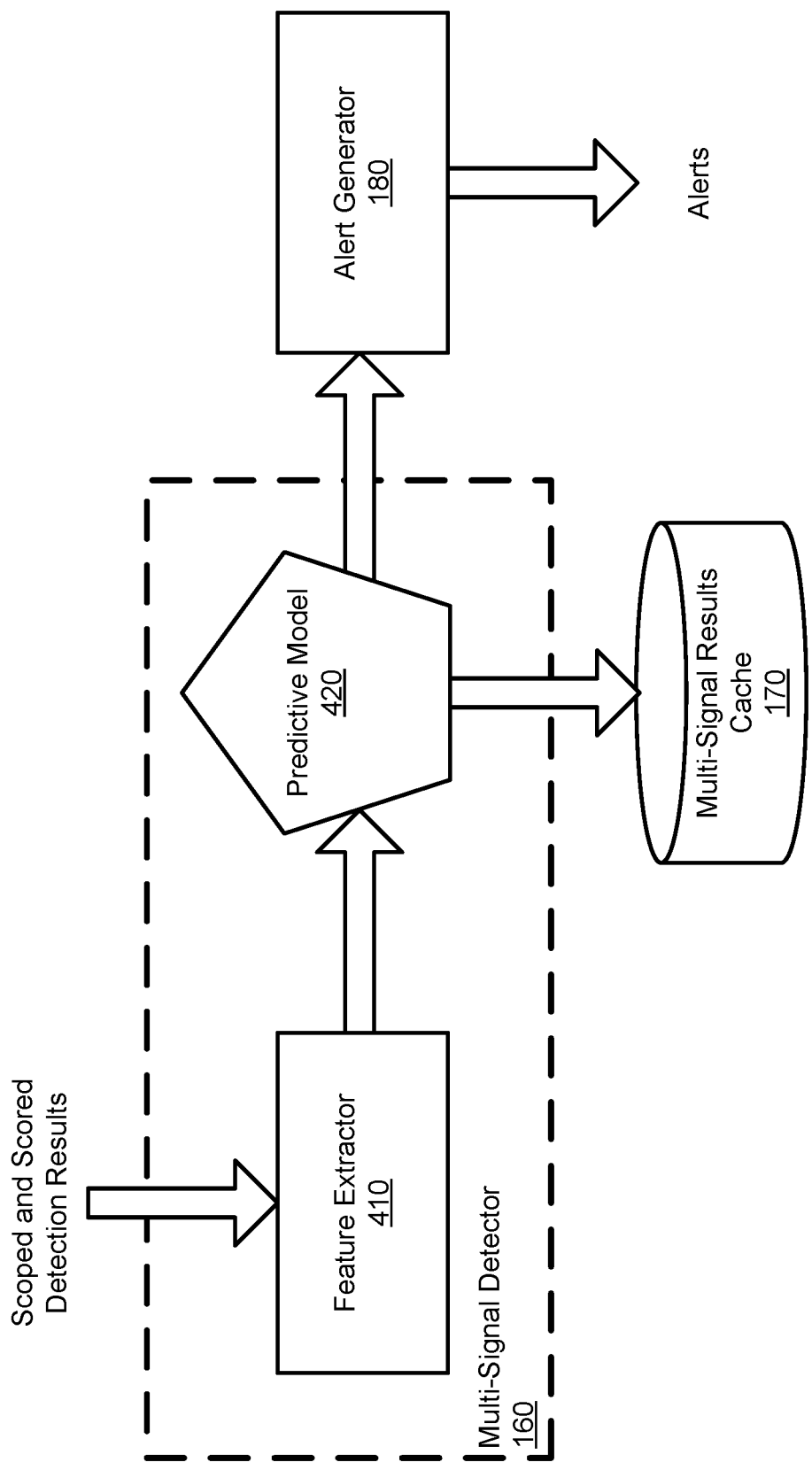
FIG. 4 illustrates details of the multi-signal detector.

FIG. 4 illustrates details of the multi-signal detector 160. The multi-signal detector 160 receives, on a scope-by-scope basis (e.g., scored detection results on a per-device, per-user, or per-process basis), scoped groups of one or more scored detection results. A feature extractor 410 receives the collection of scored detection results for the scope to be analyzed, and is configured to extract various characteristics from the scored detection results to produce a feature vector for use by a predictive model 420 to determine whether a given scope is producing malicious behavior.

The feature extractor 410 is configured to identify characteristics from the scored detection results, such as, for example: port used, IP address connected to, device identity/type, user identity, process identity, action taken, timestamp, anomaly score, etc. The characteristics are converted into numeric values (i.e., features) for use as a features vector for the predictive model 420. The predictive model 420 is an algorithm trained according to a machine learning technique for a given feature vector to provide a confidence score of whether the scope from which the feature vector was extracted is exhibiting malicious behaviors.

The predictive model 420 may be continuously retrained, according to one of a variety of machine learning techniques. One of ordinary skill in the art will be familiar with various machine learning techniques that may be employed in conjunction with the present disclosure, which include supervised, semi-supervised, and unsupervised learning session. In various aspects, a plurality of predictive models 420 may be available from which the multi-signal detector 160 (or an analyst or administrative user) may select one or more for analyzing a given scope based on their accuracy according to an evaluation dataset, areas under precision and recall curves, or other metrics and for comparison to other predictive models 420.

The confidence scores produced by the predictive model 420 are stored in the multi-signal results cache 170, for review by an analyst or administrative user and/or for model training purposes. Additionally, alert logic is used to determine whether an alert related to a detection result should be transmitted to an analyst or administrative user. When the confidence score produced by the predictive model 420 satisfies a confidence threshold that the feature vector for the given scope indicates that the scope is exhibiting malicious behavior, an alert generator 180 will be communicated the determination and necessary details to generate an alert detailing the malicious behavior.

Figure 5:
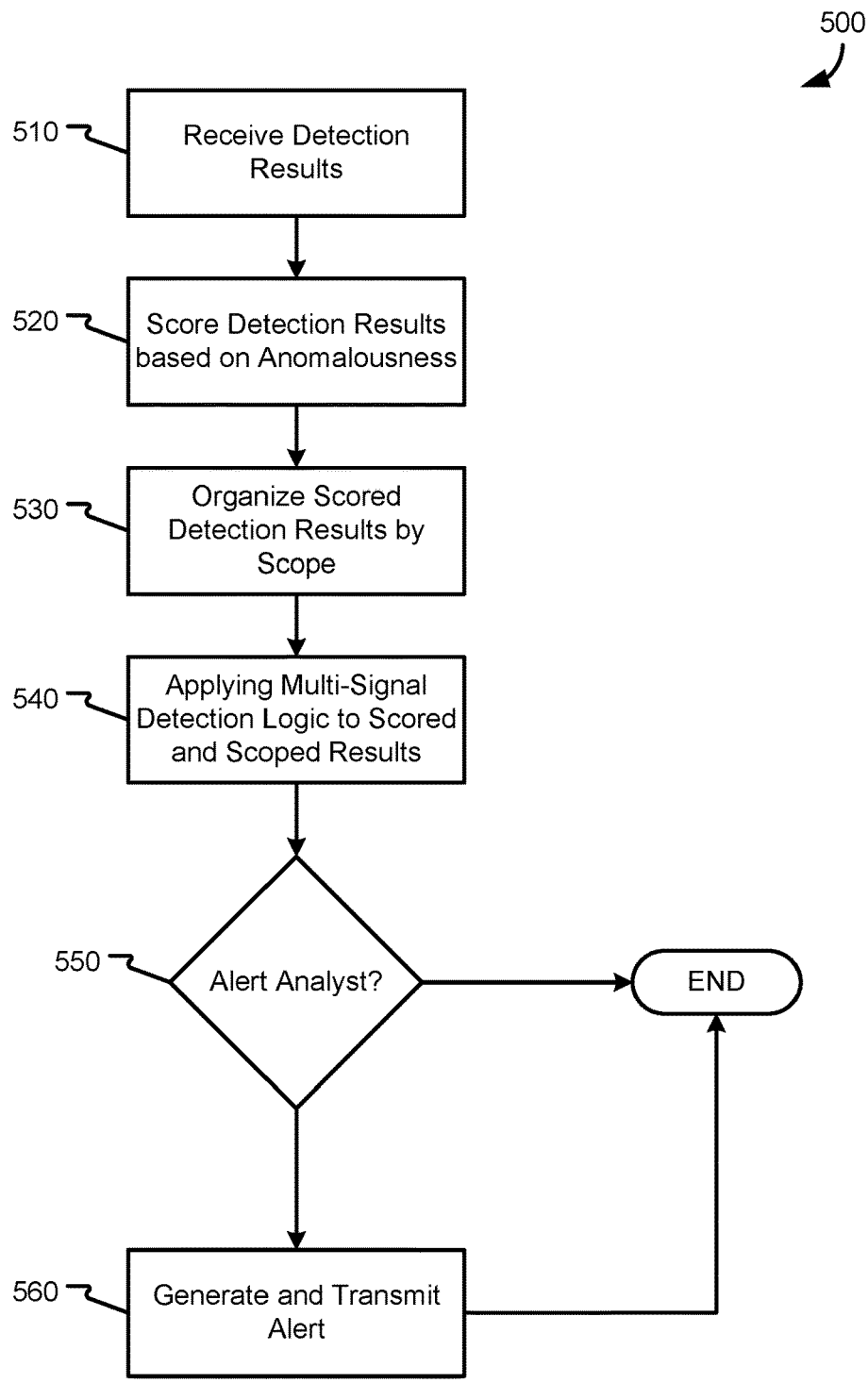
FIG. 5 is a flow chart showing general stages involved in an example method for detecting compromised host scopes in an online service.

FIG. 5 is a flow chart showing general stages involved in an example method 500 for detecting compromised host scopes in an online service 110. Method 500 begins with OPERATION 510, where detection results for events are received. Detection results are received according to detection logic identifying various behaviors in the online service 110, and include information provided in one or more signals or files including, but not limited to: network communication traces, error logs, event logs, system commands, and the like.

Method 500 proceeds to OPERATION 520, where the detection results are scored according to how anomalous the behaviors they represent are within a rolling window of time. In various aspects, behaviors from outside the rolling window of time are included in the anomaly score of the detection event to include hypothetical or historical behaviors (collectively referred to as historical behaviors) that are designated by an analyst or other administrative user for further analysis.

At OPERATION 530, the scored detection results are organized by various scopes. Scopes include divisions of the detection results based on one or more characteristics chosen by an analyst or other administrative user for dividing the online service 110 into component parts for analyzing whether malicious activities can be isolated to a given part. Example scopes include, but are not limited to: individual devices/hosts within the online service 110, user accounts, and processes/applications. Events that do not fall within a given scope, and scopes that do not have a number of events exceeding a threshold amount, may be excluded from a current round of analysis.

Proceeding to OPERATION 540, multi-signal detection logic is applied to the scored and scoped detection results to determine a confidence of whether a given scope has been compromised. Various trained machine learning models (which may be continuously retrained and updated based on incoming detection signals) are used to predictively determine whether a given device (or user or process) is behaving maliciously based on the scored detection results submitted in the scope. Various characteristics of the detection results provided in the scope are converted into features (numeric representations of the various characteristics) and are fed into a predictive model 420 to produce a confidence score as to whether the behavior is malicious.

At DECISION 550, the confidence score is compared against a confidence threshold as to whether alert an analyst or other administrative user to malicious behavior. In response to the confidence score satisfying the confidence threshold, it is determined that the analyst or other administrative user is to be alerted, and method 500 proceeds to OPERATION 560. Otherwise, in response to the confidence score not satisfying the confidence threshold, method 500 may end, but may repeat from OPERATION 510 in response to receiving a subsequent detection result.

At OPERATION 560 an alert is generated and transmitted. In various aspects, the alert identifies the behavior and detection result that triggered the alert as well as the scope that was analyzed to trigger the alert. For example, an alert may state that at time t, user A granted user B administrative permissions (behavior) on device C (scope). An alert may be generated and transmitted according to a plurality of formats, including, but not limited to: an application message (e.g., within a SIEM application), email (to an email account), a text or multi-media message (to a cell or Voice over Internet Protocol (VOIP) account), a page (to a pager number), etc. Method 500 may then end, but may repeat from OPERATION 510 in response to receiving a subsequent detection result.

Figure 6:
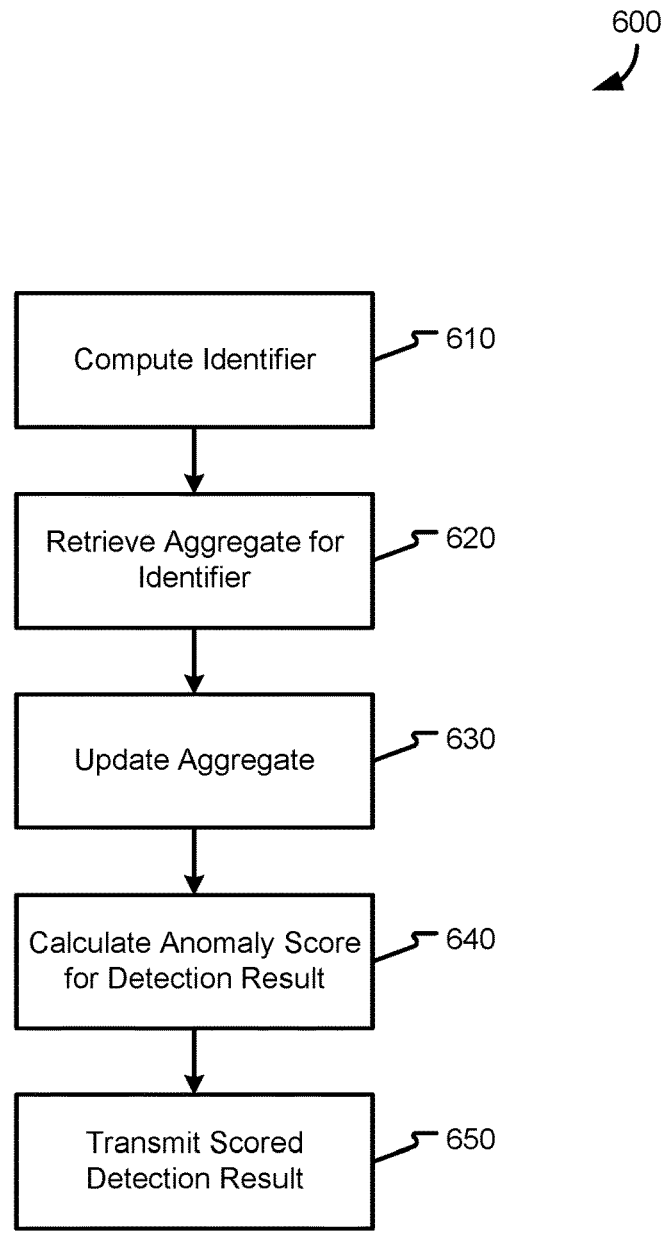
FIG. 6 is a is a flow chart showing general stages involved in an example method for scoring detection results based on anomalousness.

FIG. 6 is a is a flow chart showing general stages involved in an example method 600 for scoring detection results based on anomalousness. Method 600 is one example of sub-steps of OPERATION 520 of FIG. 5. Method 600 begins with OPERATION 610, where an identifier is computed for the detection result. In various aspects, different field values from the detection result (e.g., source device name, destination IP address, user, action type, action effects, timestamp) are used to create the identifier. The identifier may use the field values themselves (with or without field names) or a derived value of the one or more field values, such as a cryptographic hash of the field values, as an identifier for the observed behavior.

At OPERATION 620, the aggregate counts for the identifier are retrieved from the signal aggregates cache 140. The aggregate counts for the population of behaviors observed and particular subpopulations for the given behavior may be retrieved based on a rolling time window, such that the counts are based on behaviors that occurred within a given period of time from the current time (e.g., within the last d days). In some aspects, historical observed behaviors defined by an analyst user are included in the population counts regardless of whether they were observed in the rolling time window.

Method 600 proceeds to OPERATION 630, where the aggregate counts are updated in the signal aggregates cache 140. In various aspects, counts for various populations and subpopulations (e.g., behaviors for device A, user B, process C, and combinations thereof) are incremented in response to observing a particular behavior or set of behaviors. These incrementations affect the aggregated count so long as the behavior that resulted in incrementing the particular account are designated as part of the rolling analysis window; behaviors will age out and the count will be decremented accordingly unless the behavior is designated for use as a historical behavior.

At OPERATION 640 an anomaly score for the detection result is calculated. In various aspects and analyst or administrative user may select one or more formulas (such as FORMULA 1, given above). In various aspects, a raw count of all events observed in the online service 110 within a given analysis window are provided as a population count, while in other aspects a scoped count of the events observed in the online service 110 that conform to an analyst-defined scope of the online service 110 are provided as a population count. Additionally, subpopulation counts for the number of previous observations of the behavior sharing the identifier computed in OPERATION 610 are provided relative to the raw population and the scoped populations (if defined).

The anomaly scores provide a representation of the extent to which a given behavior has been previously observed. In aspects where a population count (raw or scoped) falls below a population threshold, a default value for the anomaly score (e.g., 100% anomalous, 0% anomalous) may be assigned based on analyst preferences. Similarly, when a subpopulation count falls below a subpopulation threshold, a default value for the anomaly score (e.g., 100% anomalous, 0% anomalous) may be assigned or the behavior may be "debounced" to wait and allow the subpopulation to potentially grow before assigning a population score.

One or more of these anomaly scores, population counts, and subpopulation counts are persisted as new attributes of the detection results on which they are based, and are transmitted to the multi-signal detector 160 at OPERATION 650. Method 600 may conclude after OPERATION 650, and may repeat from OPERATION 610 in response to receiving a subsequent detection result.

Figure 7:
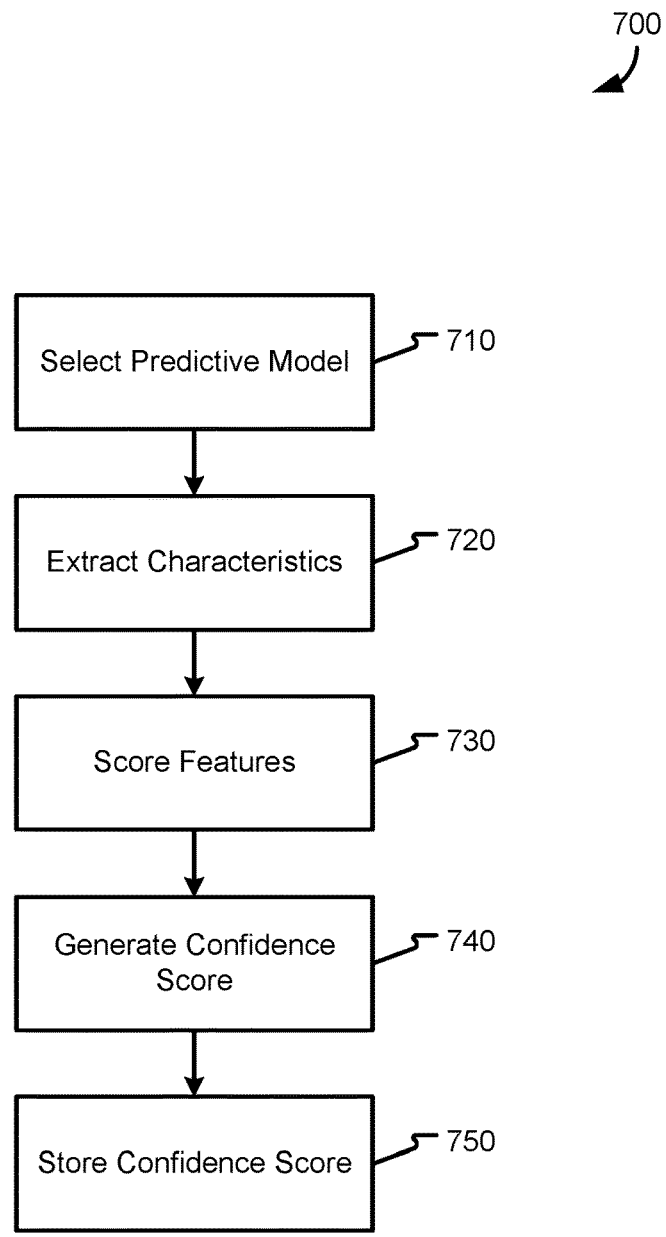
FIG. 7 is a flow chart showing general stages involved in an example method for multi-signal detection of compromised scopes.

FIG. 7 is a flow chart showing general stages involved in an example method 700 for multi-signal detection of compromised scopes. Method 700 is one example of sub-steps of OPERATION 540 of FIG. 5. Method 700 begins with OPERATION 710, where one or more predictive models 420 are selected. Predictive models 420 are selected based on a number of reasons including, but not limited to: feature sets available for analysis; an accuracy or predictive precision compared to other models; a desired behavior to analyze; available processing resources; whether a model is being deployed for production, training, or evaluation; etc. One or more predictive models 420 may be selected for a given scope being analyzed that correspond to various behaviors that an analyst or other administrative user wishes to look for within the online service 110.

At OPERATION 720, characteristics are extracted from the scored detection results that correspond to the feature sets of the selected predictive models 420. Each predictive model 420 is trained to recognized various behaviors in the online service based on characteristics from the detection results, and may be associated with a given feature vector that represents one or more characteristics in a numeric format (e.g., as an array of numbers). As the characteristics may include numeric values (e.g., anomaly scores, population counts), text values (e.g., user names, action names, process names), and pseudo-numeric values (e.g., an IP address, a timestamp), the characteristics are scored for conversion into features at OPERATION 730. One of ordinary skill in the art will be familiar with various operations by which to convert non-numeric values into numeric values for use as features. In various aspects, a compression or formatting operation (e.g., a sigmoid squashing function) is applied to the numeric conversions (and originally numeric) of the characteristics to format the feature value for consumption by the predictive model 420.

Proceeding to OPERATION 740, the selected predictive model 420 is passed the feature vector to generate a confidence score as to whether the behavior(s) of the detection results are malicious or benign. The predictive model 420 is an algorithm that accepts one or more feature vectors (and, in some aspects, the outputs of other predictive models 420) as inputs to produce a confidence score as an output. The confidence score is a prediction that indicates a level of certainty as to whether a behavior represented by the inputs can be classified as malicious or benign. In various aspects, the predictive model 420 is developed over many epochs of a continuous machine learning process to predict whether a given behavior should be treated as malicious or benign, and may adapt its predictions based on feedback received from analyst or other administrative users and other models as time progresses over successive learning phases.

Once a confidence score is generated, it is stored for transmission or later use at OPERATION 750. For example, the confidence score may be stored in a multi-signal results cache 170 for use in a training set to iteratively improve the predictive models 420 in a next learning phase of a machine learning process. In another example, the confidence score is stored for transmission to an alert generator 180, where it may be determined whether to generate an alert for the observed behavior based on the confidence score and alert logic. Method 700 may then conclude, and may repeat from OPERATION 710 in response to receiving another scope of detection results to analyze.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
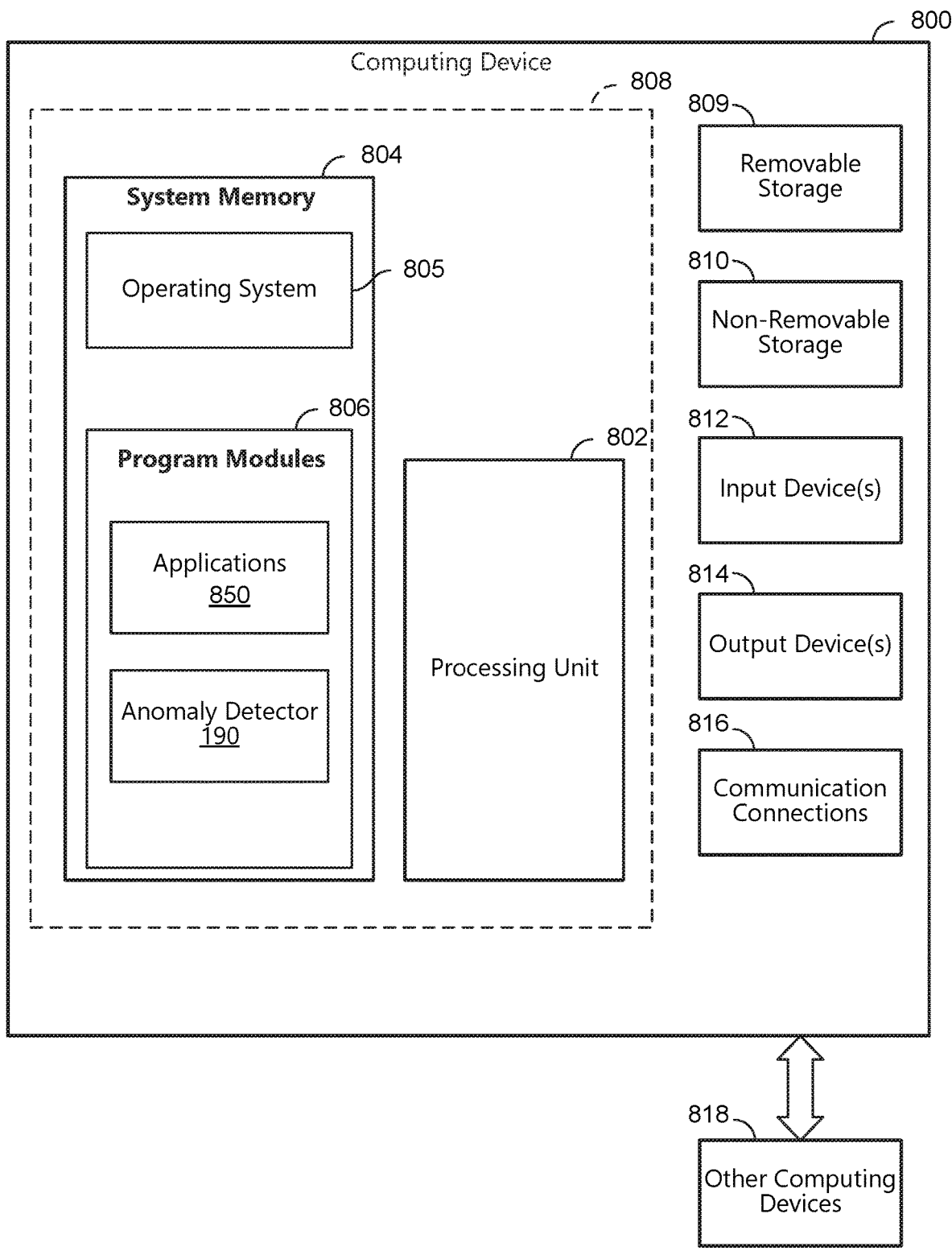
FIG. 8 is a block diagram illustrating example physical components of a computing device.
Figure 9A:
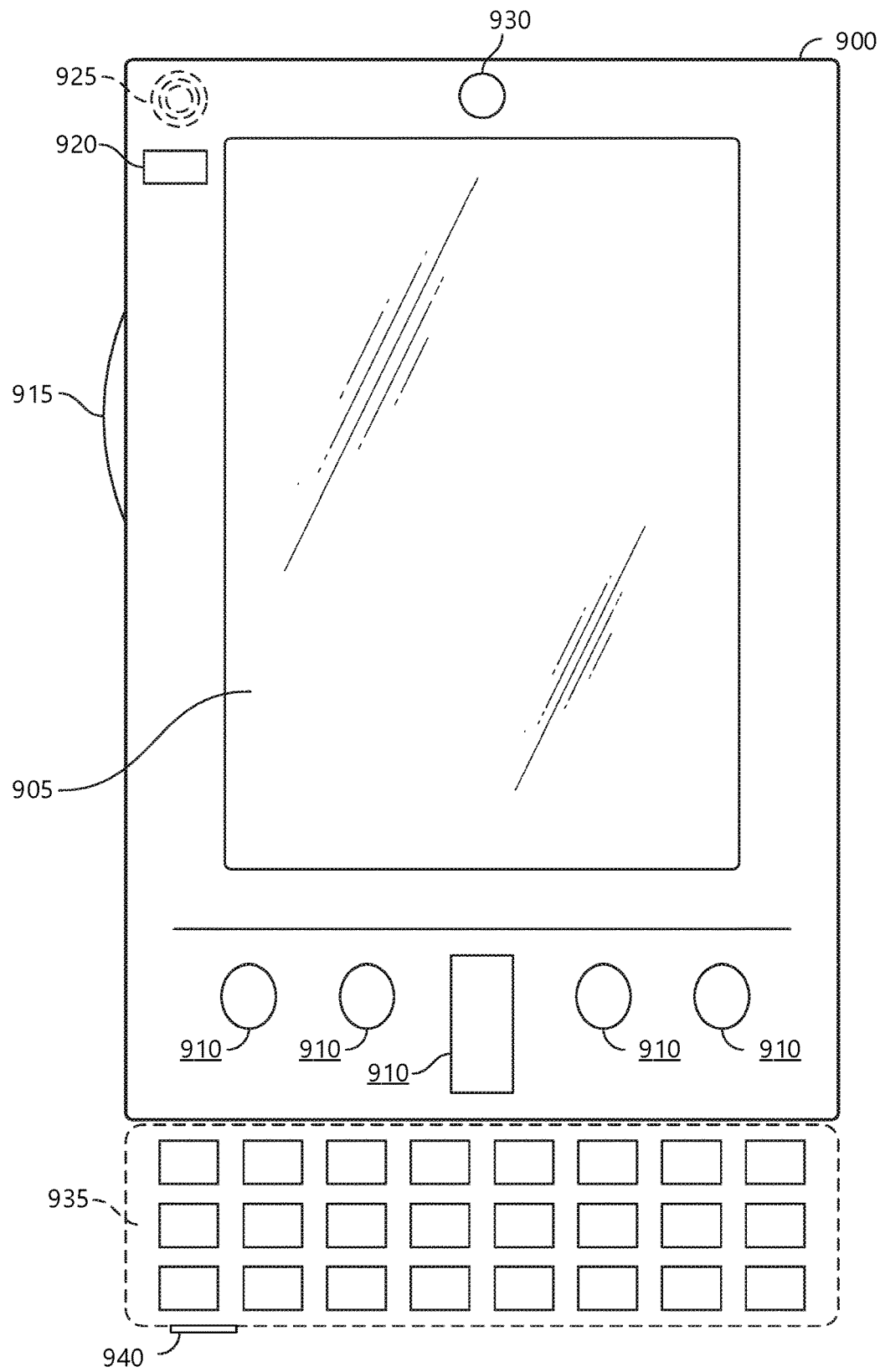
FIGS. 9A and 9B are block diagrams of a mobile computing device.
Figure 9B:
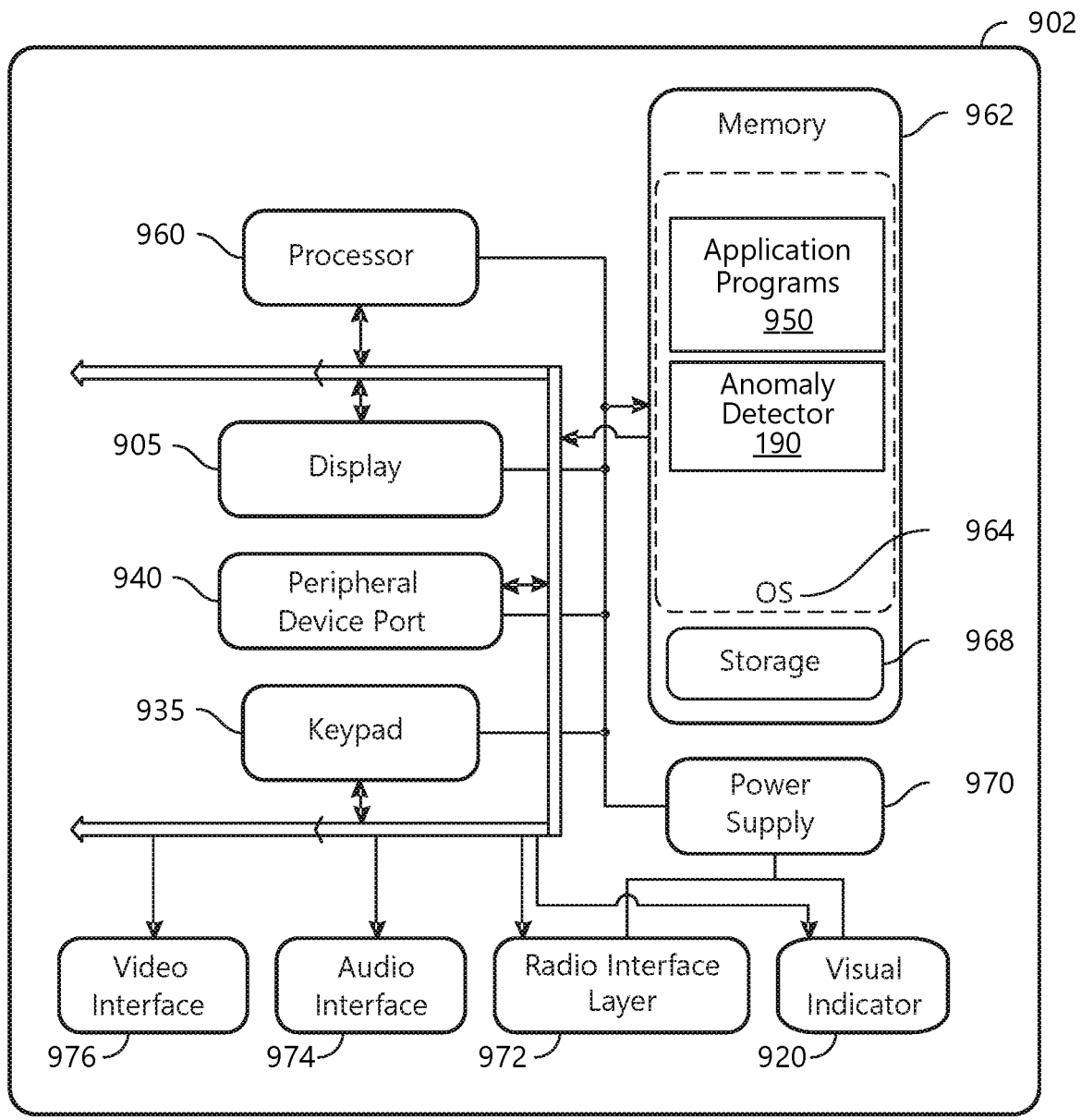

FIGS. 8, 9A, and 9B and the associated descriptions provide a discussion of a variety of operating environments in which examples are practiced. However, the devices and systems illustrated and discussed with respect to FIGS. 8, 9A, and 9B are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes anomaly detector 190. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., anomaly detector 190) perform processes including, but not limited to, one or more of the stages of the methods 500, 600, and 700 illustrated in FIGS. 5, 6, and 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or fewer input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, anomaly detector 190 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 are stored locally on the mobile computing device 900, as described above. According to another aspect, the data are stored on any number of storage media that are accessible by the device via the radio 972 or via a wired connection between the mobile computing device 900 and a separate computing device associated with the mobile computing device 900, for example, a server computer in a distributed computing network, such as the Internet. As should be appreciated such data/information are accessible via the mobile computing device 900 via the radio 972 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method implemented on a computing device for providing compromised scope alerts within an online service, the method comprising:
   receiving a detection result that identifies a behavior observed within the online service;
   based on the detection result, retrieving aggregate counts that indicate an extent to which the behavior has been previously observed within the online service, wherein the aggregate counts comprise a population count that indicates a total number of previous observations of the behavior and a subpopulation count that indicates a number of previous observations of the behavior that share a given identifier;
   based on the detection result, updating the aggregate counts comprising the population count and the subpopulation count;
   determining a scope associated with analyzing the detection result;
   calculating an anomaly score based on the updated aggregate counts and the scope, wherein the anomaly score is calculated using a ratio between the subpopulation count and the population count for the given behavior;
   based on the anomaly score transmitting an alert associated with the detection result.

2. The method of claim 1, wherein retrieving the aggregate counts comprises retrieving the subpopulation count and the population count.

3. The method of claim 2, further comprising:
   retrieving, as the subpopulation count, a number of previous observations of the behavior within the online service; and
   retrieving, as the population count, a total number of previous observations of any behavior within the online service.

4. The method of claim 2, further comprising:
   retrieving, as the subpopulation count, a number of entities within the scope associated with previous observations of the behavior within the online service; and
   retrieving, as the population count, a total number of entities comprising the scope.

5. The method of claim 2, wherein updating the aggregate counts includes incrementing one or more of the subpopulation count and the population count.

6. The method of claim 5, wherein transmitting the alert associated with the detection result comprises presenting the alert in one of the following formats: an application message, an email, a text, a multi-media message, a page.

7. The method of claim 5, further comprising determining that the updated aggregate counts are above a threshold, wherein determining the updated aggregate counts are above the threshold comprises:
   after the one or more of the subpopulation count and the population count are incremented, determining:
   the subpopulation count is above a subpopulation threshold; and
   the population count is above a population threshold.

8. The method of claim 1, further comprising generating a confidence score based at least in part on the anomaly score;
   determining the confidence score satisfies a confidence threshold, wherein generating the confidence score comprises: applying multi-signal detection logic to the scope to generate the confidence score.

9. The method of claim 8, wherein the scope is associated with one of: a device of the online service, a user account associated with the online service, or a process executing within the online service.

10. The method of claim 8, wherein applying the multi-signal detection logic to the scope to generate the confidence score further comprises:
    selecting a predictive model;
    extracting characteristics from the detection result, at least one of the characteristics including the anomaly score;
    scoring the characteristics for conversion into numerically valued features; and
    providing the numerically valued features to the predictive model to generate the confidence score.

11. A computing device for providing compromised scope alerts within an online service, the computing device comprising:
    a processor; and
    a memory storing instructions that, when executed by the processor, cause the processor to:
    receive a detection result that identifies a behavior observed within the online service;
    based on the detection result, retrieve aggregate counts that indicate an extent to which the behavior has been previously observed within the online service, wherein the aggregate counts comprise a population count that indicates a total number of previous observations of the behavior and a subpopulation count that indicates a number of previous observations of the behavior that share a given identifier;
    based on the detection result, update the aggregate counts comprising the population count and the subpopulation count;
    determine a scope associated with analyzing the detection result;
    calculate an anomaly score based on the updated aggregate counts and the scope, wherein the anomaly score is calculated using a ratio between the subpopulation count and the population count for the given behavior;
    based on the anomaly score transmit an alert associated with the detection result.

12. The computing device of claim 11, wherein the processor is further caused to:
    compute an identifier for the detection result, wherein the identifier includes one or more of a role for a device from which the behavior was observed, a user of the device from which the behavior was observed, a class of the behavior, and a timestamp; and
    use the identifier to retrieve the aggregate counts.

13. The computing device of claim 11, wherein the aggregate counts retrieved are one of raw aggregate counts or scoped aggregate counts.

14. The computing device of claim 13, wherein:
    the raw aggregate counts include a raw subpopulation count and a raw population count,
    the raw subpopulation count is a number of previous observations of the behavior within the online service, and
    the raw population count is a total number of previous observations of any behavior within the online service.

15. The computing device of claim 14, wherein to update the aggregate counts, the processor is further caused to:

increment the raw subpopulation count and the raw population count.

16. The computing device of claim 13, wherein:
the scoped aggregate counts include a scoped subpopulation count and a scoped population count,
the scoped subpopulation count is a number of entities within the scope that are associated with previous observations of the behavior within the online service, and
the scoped population count is a total number of entities comprising the scope.

17. The computing device of claim 16, wherein to update the aggregate counts, the processor is further caused to:
increment the scoped subpopulation count when an entity associated with the behavior is an entity that has not been associated with the previous observations of the behavior within the online service; and
increment the scoped population count when the entity associated with the behavior is a new entity within the scope.

18. A computer readable storage device including processor executable instructions for providing compromised scope alerts within an online service, the processor executable instructions comprising:
receiving a detection result that identifies a behavior observed within the online service;
based on the detection result, retrieving aggregate counts that indicate an extent to which the behavior has been previously observed within the online service, wherein the aggregate counts comprise a population count that indicates a total number of previous observations of the behavior and a subpopulation count that indicates a number of previous observations of the behavior that share a given identifier;
based on the detection result, updating the aggregate counts comprising the population count and the subpopulation count;
determining a scope associated with analyzing the detection result;
calculating an anomaly score based on the updated aggregate counts and the scope, wherein the anomaly score is calculated using a ratio between the subpopulation count and the population count for the given behavior;
based on the anomaly score transmitting an alert associated with the detection result.

19. The computer readable storage device of claim 18, wherein retrieving the aggregate counts comprises:
retrieving the subpopulation count and the population count, wherein:
the subpopulation count comprises one of:
a number of previous observations of the behavior within the online service, or
a number of entities within the scope associated with the previous observations of the behavior within the online service; and
the population count respectively comprises one of:
a total number of previous observations of any behavior within the online service, or
a total number of entities comprising the scope.

20. The computer readable storage device of claim 18, wherein generating the confidence score comprises:
selecting a predictive model;
extracting characteristics from the detection result, at least one of the characteristics including the anomaly score;
scoring the characteristics for conversion into numerically valued features; and
providing the numerically valued features to the predictive model to generate the confidence score.

* * * * *